(12) United States Patent
Harmer et al.

(10) Patent No.: US 8,143,371 B2
(45) Date of Patent: Mar. 27, 2012

(54) PREPARATION OF POLYTRIMETHYLENE ETHER GLYCOL OR COPOLYMERS THEREOF

(75) Inventors: Mark Andrew Harmer, Landenberg, PA (US); Christian Hoffmann, Newark, DE (US); Scott Christopher Jackson, Wilmington, DE (US); Edward R. Murphy, Wilmington, DE (US); Rupert Spence, Kingston (CA)

(73) Assignee: E I du Pont de Nemours and Company, Wilmington, DE (US)

( * ) Notice: Subject to any disclaimer, the term of this patent is extended or adjusted under 35 U.S.C. 154(b) by 642 days.

(21) Appl. No.: 12/262,609

(22) Filed: Oct. 31, 2008

(65) Prior Publication Data

US 2009/0118464 A1    May 7, 2009

Related U.S. Application Data

(60) Provisional application No. 60/984,437, filed on Nov. 1, 2007.

(51) Int. Cl.
*C08F 6/06*    (2006.01)
*C08F 6/12*    (2006.01)
*C08G 65/34*   (2006.01)

(52) U.S. Cl. ........ 528/482; 528/425; 528/485; 528/486; 528/500; 528/501; 528/503; 528/396

(58) Field of Classification Search ................... 528/425, 528/486, 500, 501, 503, 396, 482, 485; 568/619
See application file for complete search history.

(56) References Cited

U.S. PATENT DOCUMENTS

| | | | |
|---|---|---|---|
| 2,520,733 | A | 8/1950 | Morris et al. |
| 3,282,875 | A | 11/1966 | Connolly et al. |
| 3,326,985 | A | 6/1967 | Mason |
| 3,506,635 | A | 4/1970 | Anderson |
| 4,329,435 | A | 5/1982 | Kimoto et al. |
| 4,330,654 | A | 5/1982 | Ezzell et al. |
| 4,358,545 | A | 11/1982 | Ezzell et al. |
| 4,433,082 | A | 2/1984 | Grot |
| 4,610,762 | A | 9/1986 | Birdwell |
| 5,094,995 | A | 3/1992 | Butt et al. |
| 5,824,622 | A | 10/1998 | Harmer et al. |
| 6,720,459 | B2 | 4/2004 | Sunkara et al. |
| 6,977,291 | B2 | 12/2005 | Sunkara et al. |
| 7,009,082 | B2 | 3/2006 | Sunkara et al. |
| 7,405,330 | B2 | 7/2008 | Harmer et al. |
| 2002/0007043 | A1 | 1/2002 | Sunkara et al. |
| 2004/0225163 | A1 | 11/2004 | Sunkara et al. |
| 2005/0272911 | A1 | 12/2005 | Okoshi et al. |
| 2007/0123737 | A1 | 5/2007 | Harmer et al. |

FOREIGN PATENT DOCUMENTS

WO    0144150 A    6/2001

OTHER PUBLICATIONS

International Preliminary Report on Patentability and Written Opinion of the International Searching Authority, PCT International Application PCT/US08/082010, Mailed May 14, 2010.

(Continued)

*Primary Examiner* — Duc Truong (57) ABSTRACT

This invention relates to a process for preparing polytrimethylene ether glycols or copolymers thereof having a number-average molecular weight of at least about 250 g/mole by a polycondensation reaction using at least one acid catalyst.

23 Claims, 1 Drawing Sheet

OTHER PUBLICATIONS

U.S. Appl. No. 60/984,437, filed Nov. 1, 2007, Mark Andrew Harmer et al.

G. A. Olah et al., Superacids, 1985, John Wiley & Sons (Book Not Included).

J. D. Weaver et al., Supported Fluorocarbonsulfonic Acid Catalysts, Catalysis Today, 1992, vol. 14:195-210.

M. A. Harmer et al., Synthesis and Applications of Superacids. 1,1,2,2-Tetrafluoroethanesulfonic, Green Chemistry, 2007, vol. 9:30-37.

F. J. Waller et al., Catalysis With Nafion; Chemtech (1987), 17(7), pp. 438-441.

International Search Report, PCT International Application PCT/US2008/082010, May 11, 2009.

PREPARATION OF POLYTRIMETHYLENE ETHER GLYCOL OR COPOLYMERS THEREOF

CROSS-REFERENCE TO RELATED APPLICATION

This application claims the benefit of U.S. Provisional Application No. 60/984,437 filed on Nov. 1, 2007, which application is incorporated herein by reference.

FIELD OF INVENTION

This invention relates to a process for preparing polytrimethylene ether glycols or copolymers thereof.

TECHNICAL BACKGROUND

Polytrimethylene ether glycols can be produced via the acid-catalyzed polycondensation of 1,3-propanediol, optionally in the presence of comonomer diols. Standard methods of producing polytrimethylene ether glycols using acid catalysis are described in U.S. Pat. Nos. 6,720,459, 3,326,985, and 2,520,733.

Polytrimethylene ether glycol polymers produced by the polycondensation of 1,3-propanediol can have quality problems, in particular high color, which makes them unsuitable for many end-uses, such as textile fiber applications. The color of the polymer has historically depended primarily on raw material quality and the polymerization process conditions, such as catalyst concentration and reaction temperature. Attempts to prepare higher molecular weight (i.e., greater than about 250 g/mole) polytrimethylene ether glycols that have low color generally have either been unsuccessful or required long reaction times under mild reaction conditions.

U.S. Patent Application No. 2005/0272911 discloses a method for producing a polyether polyol having reduced color by a dehydration condensation reaction using a catalyst comprised of both an acid and a base. The addition of a base can add to the cost of synthesis of the polymer, as well as to the cost of separation of the polymer from the reaction mixture.

Several recent attempts to reduce color have involved the use of post-reaction treatments. For example, U.S. Pat. No. 7,009,082 discloses a method for the removal of color bodies from polytrimethylene ether glycol by adsorption methods, and U.S. Patent Application 2004/0225163 discloses a method for color reduction by hydrogenation. These post-reaction methods are time consuming and require additional process equipment and chemicals, and are therefore expensive.

The present invention provides an improved process for preparing polytrimethylene ether glycol or its copolymers wherein the product polymers have an average molecular weight above at least about 250 g/mole and exhibit reduced color.

SUMMARY

The present invention provides a process for producing a reaction product comprising at least one polytrimethylene ether glycol or copolymer thereof, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced as said reacting proceeds; and (b) maintaining the water in the reaction mixture as the reacting proceeds at a concentration above at least about 0.08% by weight relative to the weight of the reaction mixture;

whereby a reaction product is produced and wherein said reaction product has an Mn of at least about 250 grams per mole.

The present invention also provides a process for producing a reaction product comprising at least one polytrimethylene ether glycol or copolymer thereof, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced over a reaction time as said reacting proceeds;

(b) maintaining the water in the reaction mixture as the reacting proceeds at a concentration above at least about 0.08% by weight relative to the weight of the reaction mixture; and (c) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time;

whereby a reaction product is produced and wherein said reaction product has an Mn of at least about 250 grams per mole.

The at least one polycondensation catalyst can be any acid catalyst. In a more specific embodiment, the at least one polycondensation catalyst is selected from the group consisting of inorganic acids, organic sulfonic acids including fluoroalkylsulfonic acids, metal salts, zeolites, fluorinated alumina, acid-treated alumina, heteropolyacids, heteropolyacids supported on zirconia, titania, alumina and/or silica, and ion exchange-based solid acid catalysts.

The reaction product can exhibit reduced terminal unsaturation and reduced color.

BRIEF DESCRIPTION OF FIGURE

FIG. 1 shows four examples of "high-to-low temperature profiles" that can be used during a polymerization reaction to produce polytrimethylene ether glycols or copolymers thereof.

DETAILED DESCRIPTION

The present invention provides a process for preparing polytrimethylene ether glycol or copolymers thereof.

Definitions

In this disclosure a number of terms and abbreviations are used. The following definitions are provided.

By "reaction time" is meant the time required to carry out the reaction in order to achieve the desired molecular weight not including the time to heat up the reaction mixture before the reaction and the time needed to cool down the reaction mixture after the reaction.

By "temperature range" is meant the interval between minimum and maximum temperature used over the course of the reaction.

By "high-to-low temperature profile" or "high-to-low temperature ramp" is meant the function of the reaction temperature over time characterized by the average temperature during the first half (we should change "first half" to "first part") of the reaction time being higher than the average temperature during the second half of the reaction time. The average temperature ($T_{average}$) within the time span from $t_1$ to $t_2$ is defined as the arithmetic mean of the temperature $T(t)$, i.e.

$$T_{average} = \frac{1}{(t_2 - t_1)} \int_{t_1}^{t_2} T(t) \, dt,$$

with T indicating the reaction temperature and t the reaction time.

Figure 1A:
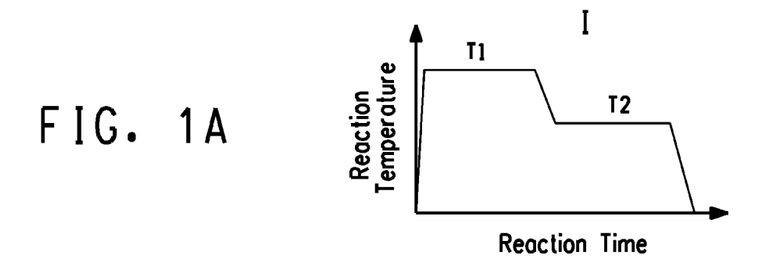
Figure 1B:
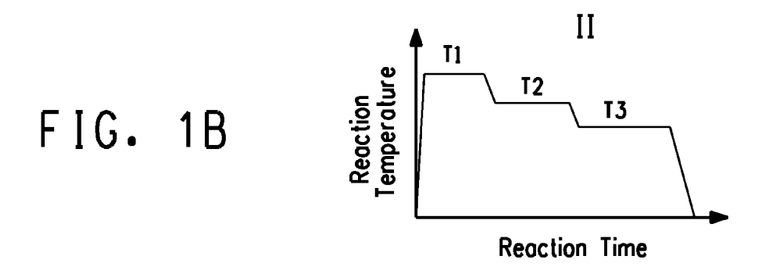
Figure 1C:
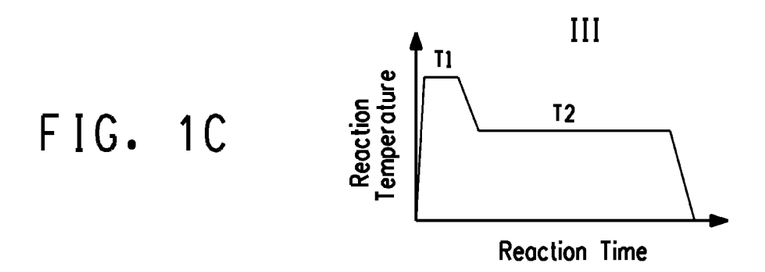
Figure 1D:
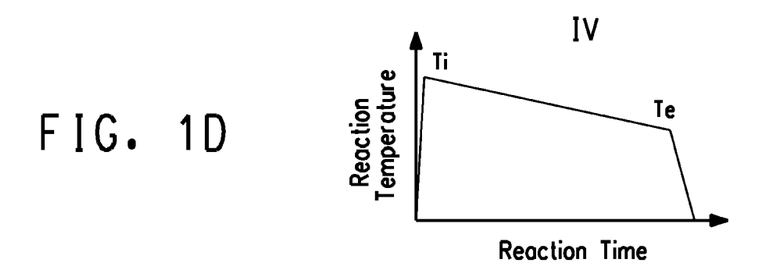

The high to low temperature profile can be carried out by ramping the temperature down in either a step-wise manner or continuously. If carried out in a step-wise manner, the reaction can be carried out with one step change in temperature or multiple step changes, wherein the time for each individual step is independent of any other step, and the rate at which the temperature is dropped between steps can vary for each step. As one example of the high to low temperature profile, one could carry out a reaction initially at 170° C. for 4 hours, and then the temperature could be lowered to 160° C. for an additional 8 hours. Additional examples for high to low temperature profiles are illustrated in plots I to IV of FIG. 1, wherein the temperatures are designated as T1 to T2 for a process involving a one step-change, T1 through T3 for a process involving two step-changes, and $T_{initial}$ ($T_i$) to $T_{end}$ ($T_e$) for a multiple step or continuous change.

By "acid catalyst" is meant an acid that promotes the condensation reaction of alcohols to ethers.

By "homogeneous acid catalyst" or "homogeneous catalyst" is meant a catalyst that is molecularly dispersed with the reactants in the same phase.

By "heterogeneous acid catalyst" or "heterogeneous catalyst" is meant a catalyst that is in a distinct second phase such as a solid.

By "polycondensation reaction" is meant a reaction carried out according to aspects of this invention wherein at least one polycondensation catalyst is used.

By "molecular weight" or "Mn" is meant the number-average molecular weight, typically reported in grams per mole, i.e., the total weight of all the polymer molecules in a sample, divided by the total number of polymer molecules in the sample.

By the terms "unsaturated end groups" or "terminal unsaturation" or "unsaturation" is meant the presence of a terminal carbon-carbon double bond (C=C) in the polymer molecule.

By "color" is meant the existence of visible color that can be quantified by using a spectrocolorimeter or a spectrophotometer in the range of visible light, using wavelengths of approximately 400-800 nm, and by comparison to pure water.

By "degree of polymerization" is meant the number of monomer units in an average polymer chain at time t in a polymerization reaction.

The present invention provides a process for producing a reaction product comprising at least one polytrimethylene ether glycol or copolymer thereof, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced as said reacting proceeds; and (b) maintaining the water in the reaction mixture as the reacting proceeds at a concentration above at least about 0.08% by weight relative to the weight of the reaction mixture;

whereby a reaction product is produced and wherein said reaction product has an Mn of at least about 250 grams per mole.

The reacting of at least one alkanediol and at least one polycondensation catalyst leads, over time, to the formation of at least one homopolymer of polytrimethylene ether glycol. When said reacting is carried out in the presence of a comonomer diol, at least one copolymer of polytrimethylene ether glycol is formed. In addition to polymer formation, water is produced in these polycondensation reactions. As is known to those skilled in the art, as the amount of water in the reaction increases, the water can eventually lead to an undesirable decrease in the reaction rate. Typically, therefore, water has been removed from the reaction as it is produced; see for example U.S. Pat. No. 6,977,291, Example 1 (column 9, lines 1-20) where the water of reaction is removed by distillation.

In contrast, in the present invention, as the reacting proceeds, the water concentration is maintained above at least about 0.08% by weight relative to the weight of the reaction mixture. In one aspect, water is maintained at about 0.08% to about 2.0% by weight relative to the weight of the reaction mixture. In another aspect, water is maintained at about 0.08% to about 0.5%. In yet another aspect, water is maintained at about 0.1% to about 0.3%. By use of the term "maintaining the water in the reaction mixture as the reacting proceeds" it is meant that as the reaction proceeds, water is produced in one aspect and lost in another. Initially, water is produced at concentrations exceeding 0.08% by weight relative to the weight of the reaction mixture, as water is lost, the water concentration is maintained at a concentration above at least about 0.08% by weight relative to the weight of the reaction mixture.

The "reaction mixture" is the mixture that is produced as said reacting proceeds. In the presence of at least one polycondensation catalyst, as said reacting proceeds the at least one alkanediol reactant, and optionally the at least one comonomer diol, is converted to a reaction product comprising at least one polytrimethylene ether glycol, or copolymer thereof, said reaction product having an Mn above at least about 250 g/mole at the end of said reacting. In addition, water is formed as said reacting occurs. Thus the reaction mixture is the mixture that would be observed at any point in this process, and would comprise unreacted alkanediol, unreacted optional comonomer diol, the at least one polycondensation catalyst, the at least one polytrimethylene ether glycol or copolymer thereof that has been formed, and water. The water could include water formed during the reaction, as well as water added to the reaction in order to maintain the concentration above at least 0.08%.

The water concentration in the reaction mixture can be determined, for example, by withdrawing samples of the reaction mixture and analyzing the samples by Karl Fisher water (moisture) analysis. The water concentration in the reaction mixture is impacted by many factors such as the molecular weight of the polymer, the reaction temperature and the rate at which sparge gas (e.g., $N_2$) is added to the reaction. The water concentration in the reaction mixture can be controlled by adding water to the reaction mixture or by controlling reaction conditions such as temperature. Alternatively, as the polymerization reaction produces water, adjusting the sparge gas rate may permit the water concentration to be controlled. For example, if the water concentration needs to be increased, lowering the sparge rate or stopping the sparge gas will decrease the evolution of water vapor from the reactor and increase or maintain the water concentration in the reaction mixture. Similarly, increasing the sparge gas rate will decrease the water concentration of the reaction mixture.

In one aspect of the invention, the alkanediol reactant is selected from the group consisting of 1,3-propanediol, a dimer of 1,3-propanediol, a trimer of 1,3-propanediol, and mixtures thereof. In another aspect, the alkanediol reactant is 1,3-propanediol or a mixture of 1,3-propanediol and oligomers thereof, said mixture comprising at least 90 weight % of 1,3-propanediol. In yet another aspect, the alkanediol reactant is 1,3-propanediol.

In one aspect, the at least one comonomer diol is selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol. In a more specific aspect the comonomer diol is 1,2-ethanediol. The comonomer diol can comprise up to about 50% by weight relative to the weight of the reaction mixture.

In one broad aspect, the process of the invention can be carried out using at least one alkanediol reactant selected from the group consisting of 1,3-propanediol, a dimer of 1,3-propanediol, a trimer of 1,3-propanediol, and mixtures thereof, and at least one comonomer diol selected from the group consisting of ethanediol, $C_4$ through $C_{12}$ straight-chain diols, and $C_3$ through $C_{12}$ branched diols. In a more specific embodiment, the process of the invention can be carried out using at least one alkanediol reactant selected from the group consisting of 1,3-propanediol, a dimer of 1,3-propanediol, a trimer of 1,3-propanediol, and mixtures thereof, and at least one comonomer diol selected from the group consisting of 1,2-ethanediol, 2-methyl-1,3-propanediol, 2,2'-dimethyl-1, 3-propanediol, 1 -6-hexanediol, 1,7-heptanediol, 1,7-octanediol, 1,10-decanediol, and 1,12-dodecanediol. In an even more specific aspect, the process can be carried out using at least one alkanediol reactant selected from the group consisting of 1,3-propanediol, a dimer of 1,3-propanediol, a trimer of 1,3-propanediol, and mixtures thereof, and 1,2-ethanediol. In an even more specific aspect, the at least one alkanediol reactant is 1,3-propanediol and the at least one comonomer diol is 1,2-ethanediol.

Thermal stabilizers, antioxidants, such as butylated hydroxyl toluene, and coloring materials may also be added to the reaction mixture or to the final polymer if necessary.

The polycondensation reaction may be carried out under an inert atmosphere, such as nitrogen or argon. In another aspect, the polycondensation reaction is carried out at a pressure of less than one atmosphere; in additional aspects the reaction is carried out at a pressure of less than 50 kPa or less than 25 kPa.

The at least one polycondensation catalyst can be any acid catalyst. The at least one polycondensation catalyst is preferably selected from the group consisting of Lewis acids, Bronsted acids, super acids, and mixtures thereof. Suitable polycondensation catalysts include both homogeneous and heterogeneous catalysts. In one aspect, the suitable polycondensation catalyst is selected from the group consisting of inorganic acids, organic sulfonic acids including fluoroalkylsulfonic acids, heteropolyacids and metal salts. In a more specific aspect, the catalyst is a homogeneous catalyst selected from the group consisting of sulfuric acid, hydriodic acid, fluorosulfonic acid, phosphorous acid, p-toluenesulfonic acid, benzenesulfonic acid, methanesulfonic acid, phosphotungstic acid, nonafluorobutanesulfonic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, and zirconium triflate. Homogeneous catalysts can also include rare earth acids of the form $La(1,1,2,2,\text{-tetrafluoroethane sulfonate})_3$, $La(1,1,2,3,3,3\text{-hexafluoropropanesulfonates})_3$, $Sc(1,1,2,2,\text{-tetrafluoroethane sulfonate})_3$, $Sc(1,1,2,3,3,3\text{-hexafluoropropanesulfonates})_3$, $Ac(1,1,2,2,\text{-tetrafluoroethane sulfonate})_3$, $Ac(1,1,2,3,3,3\text{-hexafluoropropanesulfonates})_3$, $Yb(1,1,2,2,\text{-tetrafluoroethane sulfonate})_3$ and $Yb(1,1,2,3,3,3\text{-hexafluoropropanesulfonates})_3$, as well as $SbF_5$-HF (magic acid) and mixtures of fluorosulfuric acid and antimony pentachloride, as described by G. A. Olah, G. K. Surya Prakash and J. Sommer in "Superacids" (John Wiley & Sons, NY, 1985).

The at least one polycondensation catalyst can also be a heterogeneous catalyst selected from the group consisting of zeolites, fluorinated alumina, acid-treated alumina, heteropolyacids and heteropolyacids supported on zirconia, titania, alumina and/or silica, as well as ion exchange-based solid acid catalysts such as Amberlyst® 15 or perfluorinated ion exchange polymers.

Perfluorinated ion-exchange polymers (PFIEP) containing pendant sulfonic acid and carboxylic acid groups are well known compounds. See, for example, Waller et al., Chemtech, July, 1987, pp. 438-441, and references therein, J. D. Weaver et al., Catalysis Today, 14 (1992) 195-210 and U.S. Pat. No. 5,094,995, column 2, line 57 through column column 10, line 10 for a description of PFIEP containing pendant sulfonic acid groups. Perfluorinated ion-exchange polymers (PFIEP) containing pendant carboxylic acid groups have been described in U.S. Pat. No. 3,506,635, column 2, line 48 through column 8, line 38. PFIEP have structures that include a substantially fluorinated carbon chain that may have attached to it side chains that are substantially fluorinated. In addition, these polymers contain sulfonic acid groups or derivatives of sulfonic acid groups, carboxylic acid groups or derivatives of carboxylic acid groups and/or mixtures of these groups. For example, copolymers of a first fluorinated vinyl monomer and a second fluorinated vinyl monomer having a pendant cation exchange group or a pendant cation exchange group precursor can be used, e.g., sulfonyl fluoride groups ($SO_2F$) which can be subsequently hydrolyzed to sulfonic acid groups. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and mixtures thereof. Possible second monomers include a variety of fluorinated vinyl ethers with pendant cation exchange groups or precursor groups. Preferably, the polymer contains a sufficient number of acid groups to give an equivalent weight of from about 500 to 20,000, and most preferably from 800 to 2000. Representative of the perfluorinated polymers for use in the present invention are "NAFION®" PFIEP (commercially available from E. I. du Pont de Nemours and Company), and polymers, or derivatives of polymers, disclosed in U.S. Pat. No. 3,282,875, column 1, line 17 through column 9, line 70; U.S. Pat. No. 4,329,435, column 5, lines 29 through 38; U.S. Pat. No. 4,330,654, column 4, line 55 through column 8, line 53; U.S. Pat. No. 4,358,545, column 5, lines 18 through 54; U.S. Pat. No. 4,610,762, column 3, line 25 through column 4, line 28; and U.S. Pat. No. 4,433,082, column 2, line 53 through column 8, line 25. More preferably the polymer comprises a perfluorocarbon backbone and a pendant group represented by the formula —$OCF_2CF(CF_3)OCF_2CF_2SO_3X$, wherein X is H, an alkali metal or $NH_4$. Polymers of this type are disclosed in U.S. Pat. No. 3,282,875.

Suitable heterogeneous catalysts also include porous PFIEP microcomposites comprising a PFIEP containing pendant sulfonic acid and/or carboxylic acid groups entrapped within and highly dispersed throughout a network of metal oxide, a network of silica or a network of metal oxide and silica as described in U.S. Pat. No. 5,824,622, column 3, line 22 through column 7, line 65 and column 13, line 61 through column 18, line 17.

In one preferred aspect, the at least one polycondensation catalyst is selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange polymers.

The polycondensation catalyst loading is from about 0.01 weight percent to about 5.0 weight percent relative to the weight of the initial reaction mixture. In one aspect the polycondensation catalyst loading is from about 0.02 weight percent to about 1.0 weight percent. In still another aspect, the polycondensation catalyst loading is from about 0.03 weight percent to about 0.5 weight percent.

In one aspect, the polycondensation reaction is carried out at a temperature of about 120° C. to about 250° C. In another aspect, the polycondensation reaction is carried out at a temperature of about 120° C. to about 210° C. In yet another aspect, the polycondensation reaction is carried out at a temperature of about 140° C. to about 190° C. In one aspect, the reacting is carried out at a temperature of about 120° C. to about 250° C. with at least one alkanediol reactant selected from the group consisting of 1,3-propanediol and oligomers of 1,3-propanediol having a degree of polymerization of 2-6, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture. In another aspect, the reacting is carried out at a temperature of about 120° C. to about 250° C. with at least one alkanediol reactant selected from the group consisting of 1,3-propanediol and oligomers of 1,3-propanediol having a degree of polymerization of 2-6, at least one comonomer diol selected from the group consisting of ethanediol, $C_4$ through $C_{12}$ straight-chain diols, and $C_3$ through $C_{12}$ branched diols, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture.

The time for the reaction will depend on many factors, such as the reactants, reaction conditions and reactor. One skilled in the art will know to adjust the time for the reaction to achieve high yields of a reaction product having a desired molecular weight.

By maintaining the water concentration in the reaction mixture above at least about 0.08%, the color of the reaction product as determined by any suitable means such as the determination of APHA color using ASTM standard D-1209, can be reduced relative to that observed by carrying out the reaction with water removal. In one aspect, the APHA color value of the reaction product is about 100 or lower. In another aspect, the APHA color value is about 50 or lower. In yet another aspect, the APHA color value is about 25 or lower.

In one aspect, the molecular weight (Mn) of the reaction product is at least about 1000 g/mole. In another aspect, the Mn of the reaction product is at least about 2000 g/mole.

In one aspect, the reacting is carried out at a temperature of about 120° C. to about 250° C. with at least one alkanediol reactant selected from the group consisting of 1,3-propanediol and oligomers of 1,3-propanediol having a degree of polymerization of 2-6, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture, and wherein the reaction product has an APHA color value of about 100 or lower, preferably about 50 or lower, and more preferably about 25 or lower. In another aspect, the reacting is carried out at a temperature of about 120° C. to about 250° C. with at least one alkanediol reactant selected from the group consisting of 1,3-propanediol and oligomers of 1,3-propanediol having a degree of polymerization of 2-6, at least one comonomer diol selected from the group consisting of ethanediol, $C_4$ through $C_{12}$ straight-chain diols, and $C_3$ through $C_{12}$ branched diols, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture, and wherein the reaction product has an APHA color value of about 100 or lower, preferably about 50 or lower, and more preferably about 25 or lower.

In one aspect, the polycondensation reaction of the present invention can be carried out using a "high-to-low temperature profile". Thus, in one aspect, a process is provided for producing a reaction product comprising at least one polytrimethylene ether glycol or copolymer thereof, comprising:

(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced over a reaction time as said reacting proceeds;

(b) maintaining the water in the reaction mixture as the reacting proceeds at a concentration above at least about 0.08% by weight relative to the weight of the reaction mixture; and (c) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time;

whereby a reaction product is produced and wherein said reaction product has an Mn of at least about 250 grams per mole.

In one aspect, terminal unsaturation of the reaction product is reduced when a "high-to-low temperature profile" is used. In one aspect, terminal unsaturation of the reaction product is less than or equal to about 25 meq/kg. In a more specific aspect, terminal unsaturation of the reaction product is less than or equal to about 15 meq/kg. In an even more specific aspect, terminal unsaturation of the reaction product is less than or equal to about 10 meq/kg.

In one aspect, the reaction product has a color of less than or equal to about 100 APHA units. In a more specific aspect, the reaction product has a color of less than or equal to about 50 APHA units. In an even more specific aspect, the reaction product has a color of less than or equal to about 25 APHA units. In one aspect, the terminal unsaturation of the reaction product is less than or equal to about 25 meq/kg, and the color of the reaction product is less than or equal to about 100 APHA units.

In one aspect, the polycondensation reaction is carried out using a "high-to-low temperature profile" at a temperature from about 120° C. to about 210° C. with the average temperature in the first half of the reaction being 2-50° C. higher than in the second half of the reaction.

In a more specific aspect, the polycondensation reaction is carried out using a "high-to-low temperature profile" at a temperature from about 140° C. to about 190° C. with the average temperature in the first half of the reaction being 2-30° C. higher than in the second half of the reaction.

The polycondensation reaction carried out using a "high-to-low temperature profile" can be performed with any of the polycondensation catalysts described above.

In one aspect, the reaction product produced using a "high-to-low temperature profile" has an Mn of at least about 1000 g/mole. In another aspect, the reaction product produced using a "high-to-low temperature profile" has an Mn of at least about 2000 g/mole.

The process of this invention is not limited by reactor configuration, however a successful manufacturing process for polytrimethylene ether glycol should provide the product within a desired time and under conditions to achieve the average molecular weight for end use applications and to limit the production of undesired chemical species that would make the product unsuitable for end use applications or that would require costly measures to remove, for example product having high degree of unsaturation or high color. Reactor configurations, as well as a continuous process for polycondensation of 1,3-propanediol reactant, are described in U.S. Pat. No. 6,720,459, Column 5, line 49 through Column 9, line 26, and FIGS. 1 through 6. The present process can be carried out in a closed system with no fresh monomer being added over the course of the reaction. The reaction can also be carried out with fresh monomer being added to the reaction mixture and/or reaction product being withdrawn from the reaction mixture over the course of the reaction. The latter can be used to achieve a continuous reaction process. In addition, the "high-to-low" temperature profile can be carried out within one reactor or reactor zone, or in multiple reactors or zones of a reactor. For example, the polycondensation reaction can be initiated in one reactor or reactor zone, and as the temperature is modified (for example, decreased) to achieve the "high-to-low" profile, the reaction mixture can be transferred to a different reactor or reactor zone. The number of reactors, or reaction zones within a reactor, will be determined in part by the cost of the reactor(s) and the temperature profile of the reaction.

The at least one polytrimethylene glycol or copolymer thereof in the reaction product produced as described in any of the aspects of the invention can be recovered by methods known in the art, such as extraction. The at least one polycondensation catalyst can be recovered and reused in a subsequent polycondensation reaction.

The reaction product and the recovered at least one polytrimethylene glycol or copolymer thereof are useful, for example, in the formation of thermoplastic elastomers, as lubricants, and as fibers for textiles.

General Materials and Methods

The following abbreviations are used:
Nuclear magnetic resonance is abbreviated NMR; degrees Celsuis is abbreviated ° C.; Celsius is abbreviated C; gram is abbreviated g, kilogram is abbreviated kg, milliliter(s) is abbreviated mL; cubic centimeter is abbreviated cc; liter is abbreviated L; millimeter is abbreviated mm; centimeter is abbreviated cm; revolutions per minute is abbreviated rpm; minute(s) is abbreviated min; parts per million is abbreviated ppm; number-average molecular weight is abbreviated Mn; proportional integral derivative is abbreviated PID; hour(s) is abbreviated hr(s); weight percent is abbreviated wt %; reaction is abbreviated react.; temperature is abbreviated temp.; milliequivalent(s) is abbreviated meq; grams per mole is abbreviated g/mole; 1,3-propanediol is abbreviated PDO; 1,1,2,2-tetrafluoroethanesulfonic acid is abbreviated TFESA; sulfuric acid is abbreviated SA; 4-dodecylbenzenesulfonic acid is abbreviated DBS.

The polymer molecular weight (Mn) and polymer unsaturation were determined by Proton-NMR using a 500 MHz Avance DRX® NMR spectrometer (Bruker, Rheinstetten, Germany). The values for Mn reported in the examples below are in g/mole.

Polymer color was measured according to ASTM standard D-1209 as APHA values (Platinum-Cobalt system) using standard instruments such as a spectrocolorimeter (Type "ColorQuest", Hunterlab, Reston, Va., USA) or a spectrophotometer (Type "50 Conc", Varian Inc., Palo Alto, Calif., USA).

Chemicals were generally obtained from Sigma-Aldrich (St. Louis, Mo.) unless otherwise indicated. 1,1,2,2-Tetrafluoroethanesulfonic acid (TFESA) was prepared as described in M. A. Harmer et al., Green Chemistry, 2007, 9, 30-37. 1,3-Propanediol was either from E.I. DuPont de Nemours and Company (Wilmington, Del.) or Sigma-Aldrich.

Water concentration was determined by Karl-Fischer analysis, using Mettler-Toledo Model DL31 (Mettler-Toledo, Columbus, Ohio).

General reaction procedure for reactions carried out with 30 q PDO:

The polymerization reaction was carried out in a 100 mL custom-made glass flask. The flask was a modified heavy wall, round bottom, 3-neck flask with 20 degree angled side necks. In place of one of the side necks, the flask had a thermal well with an inner diameter of 6 mm to accommodate a thermal couple. In place of the other side neck, the flask had a gas sparging tube with a barbed hose connection inlet and an inner diameter of 6 mm. Both the gas sparging tube and the thermal well extended down to 5 mm above the bottom of the flask. To the center neck of the flask was attached a glass column with a length of 250 mm and an internal diameter of 12.5 mm. A 40.64 cm (16 inch) long type-J thermocouple was secured to the outside of the column, and a ribbon-type heating element was wrapped in a spiral pattern around the column with approximately 2.54 cm (1 inch) between wraps, in such a way that the tip of the thermocouple was between the two lowermost wraps of the heating element. Fiberglass insulating tape was then wrapped around the column, leaving none of the column or the heating element exposed. To the top of the column was attached a glass distilling head with a water jacketed sidearm and vacuum adapter. To the outlet of the distilling head was attached a 15 mL distillate receiver. Latex tubing was used to connect a dual-reservoir oil bubbler to the vacuum adapter on the distillation head to allow the system to be continuously purged with inert gas. A hemispherical heating mantle was used to heat the flask. A 30.48 cm (12-inch) long type-J thermocouple was used to monitor the temperature of the flask contents. The tip of the thermocouple was inserted into the thermal well on the flask, to which a small amount of heat transfer fluid was added. Two control loops were used to heat the reaction vessel and its contents to the desired temperature. In the first control loop, the 30.48 cm thermocouple inserted into the thermal well was used to measure indirectly the temperature of the flasks' contents. This temperature was fed back to a PID controller, which controlled the hemispherical heating mantle. In the second control loop, the 40.64 cm thermal couple secured to the column was used to measure the temperature of the vapor in the column. This temperature was fed back to another PID controller, which controlled the ribbon-type heating element wrapped around the column.

General Reaction Procedure for Reactions Carried out with 400 g to 800 g PDO:

The polymerization reaction was carried out in a glass 1000 mL cylindrical flask with 4 internal baffles. The top surface of the flask was flanged, with a groove into which a Viton o-ring fit. A 5-neck flanged lid was clamped to the top of the vessel. To the center neck of the lid was attached a stirrer bearing. Stirring was accomplished with a glass stirring shaft extending down to 2.54 cm (1 inch) above the bottom of the flask. The stirring shaft had two sets of blades, each set having four blades. The lower set of blades was at the bottom end of the shaft, and the upper set of blades was 7.62 cm (3 inches) above the lower set. Each blade extended 1.27 cm (0.5 inch) radialy outward from the shaft, and had a vertical height of 1.27 cm. The stirring shaft was powered by a 130 watt stirrer motor. Water and nitrogen addition were accomplished with a 6 mm OD glass tube extending down to 5.08 cm (two inches) above the bottom of the flask. Water was pumped in by a continuous cycle syringe pump. The water inlet line and nitrogen inlet line joined at a T-shaped polytetrafluoroethylene (PTFE) union attached to the top of the glass water/nitrogen addition tube. A glass thermal well extended down to 5.08 cm above the bottom of the vessel, into which a type J thermal couple was inserted to monitor the temperature of the contents of the vessel. A small amount of heat transfer fluid was added to the thermal well. To one side neck of the flask was attached a glass column with a length of 180 mm and an ID of 20 mm. A type J thermal couple was secured to the outside of the column, and a ribbon-type heating element was wrapped in a spiral pattern around the column with approximately 2.54 cm between wraps, in such a way that the tip of the thermocouple was between the two lowermost wraps of the heating element. Fiberglass insulating tape was then wrapped around the column, leaving none of the column or the heating element exposed. To the top of the column was attached a distilling head with a cold finger condenser. To the outlet of the distilling head was attached a 500 mL distillate receiver. Latex tubing was used to connect a dual-reservoir oil bubbler to the vacuum adapter on the distillation head to allow the system to be continuously purged with inert gas. A cylindrical heating mantle was used to heat the flask. Two control loops were used to heat the reaction vessel and its contents to the desired temperature. In the first control loop, the thermocouple inserted into the thermal well in the flask was used to measure indirectly the temperature of the flask's contents. This temperature was fed back to a PID controller, which controlled the cylindrical heating mantle. In the second control loop, the thermocouple secured to the column was used to measure indirectly the temperature of the vapor in the column. This temperature was fed back to another PID controller, which controlled the ribbon-type heating element wrapped around the column.

General Reaction Procedure for 1 L and 22 L Reactors:

A 1 or 22 L glass reactor equipped with a mechanical stirrer, a nitrogen dip tube tipped with a glass fritted sparger and an overhead condenser unit was sparged with $N_2$. To the reactor was then added 1,3-propanediol and the desired acid catalyst. The reaction mixture was then mixed using the stirrer and sparged using nitrogen gas to remove residual oxygen.

The reaction was heated to the desired reaction temperature using electric heat or a hot oil system. The reaction start time was set as the time at which the heat was applied to the reactor. As the reaction approached the target temperature, water from the reaction evolved from the reactor and was removed by the condenser.

The reactions were terminated by cooling the reaction mixtures to room temperature. For the reactions where water addition occurred, the reactors were set to reflux when heating was terminated.

In the comparative examples, the reactions were conducted as described above. The reactions were sparged continually with dry nitrogen to remove the water produced by the reaction. In the inventive examples, the reactions were conducted as described above but with one modification. In the inventive examples, a water line with a water feed pump was attached to the nitrogen line that provided nitrogen sparge to the reactor. By operating the water pump it was possible to add water to the reaction mixture through the nitrogen sparger. This allowed the water content in the reaction mixture to be controlled by controlling the water pump rate.

EXAMPLES

Examples 1-2

Example 1 is a comparative example and was performed at constant temperature with no water addition. 1,3-Propanediol (800 g) was added to a 1000 mL cylindrical flask. To this was added 1,1,2,2-tetrafluoroethanesulfonic acid (4.0 g). The contents of the flask were sparged with nitrogen gas at 500 cc/min for 12 hours. The homogeneous solution was heated with a heating mantle to 170 degrees C. for 12 hours. The molecular weight (Mn) of the product was 1783 with 22 meq/kg of unsaturated end groups and an APHA color of 806.

Example 2 was performed as described in Example 1, except that water was added at 5 mL/hr to the reaction mixture. The molecular weight (Mn) of the product was 1887 with 23 meq/kg of unsaturated end groups and an APHA color of 239, demonstrating that water addition reduced the color of the product.

Examples 3-4

Examples 3 and 4 were carried out as described in Example 2 (i.e., with water addition), except that a temperature ramp was also used. For Example 3, 1,3-propanediol (800 g) was added to a 1000 mL cylindrical flask. To this was added 1,1,2,2-tetrafluoroethanesulfonic acid (4.0 g). The contents of the flask were sparged with nitrogen gas at 500 cc/min for 12 hours. Water was added to the vessel at a rate of 5 mL per hour, beginning when the reaction vessel started heating. The homogeneous solution was heated with a heating mantle to 170 degrees C. for 13 hours. The temperature of the solution was then reduced to 155 degrees C. for 12 hours. Nitrogen sparging and water addition were continued throughout the duration of the reaction. The molecular weight (Mn) of the product was 2294 with 11 meq/kg of unsaturated end groups and an APHA color of 36.

Example 4 was carried out using similar conditions to that of Example 3. 1,3-Propanediol (800 g) was added to a 1000 mL cylindrical flask. To this was added 1,1,2,2-tetrafluoroethanesulfonic acid (4.0 g). The contents of the flask were sparged with nitrogen gas at 500 cc/min for 12 hours. Water was added to the vessel at a rate of 4 mL per hour, beginning when the reaction vessel started heating. The homogeneous solution was heated with a heating mantle to 170 degrees C. for 15 hours. The temperature of the solution was then reduced to 155 degrees C. for 12 hours. Nitrogen sparging and water addition were continued throughout the duration of the reaction. The molecular weight (Mn) of the product was 2002 with 18 meq/kg of unsaturated end groups and an APHA color of 35.

Examples 5-10

Examples 5-10 were carried out using a temperature ramp having 3 temperatures (in contrast to Examples 3-4 wherein 2 temperatures were used). Examples 5-6 were comparative examples carried out without added water, whereas Examples 7-10 were carried out in the presence of added water.

For comparative Example 5, 1,3-propanediol (30 g) was added to a 100 mL round bottom flask. To this was added 1,1,2,2-tetrafluoroethanesulfonic acid (0.15 g). The contents of the flask were sparged with nitrogen gas at 200 cc/min for 12 hours. The homogeneous solution was then heated with a heating mantle to 170 degrees C. for about 4 hours (with 3.00 mL of water collected). The temperature of the solution was then reduced to 155 degrees C. for about 7 hours (with 5.00 mL of water collected). The temperature of the solution was then reduced to 135 degrees C. for 16 hours. Nitrogen sparging was continued throughout the duration of the reaction. The molecular weight (Mn) of the product was 2967 with 9 meq/kg of unsaturated end groups and an APHA color of 128.

For comparative Example 6, 1,3-propanediol (30 g) was added to a 100 mL round bottom flask. To this was added 1,1,2,2-tetrafluoroethanesulfonic acid (0.15 g). The contents of the flask were sparged with nitrogen gas at 100 cc/min for 12 hours. The homogeneous solution was then heated with a heating mantle to 170 degrees C. for about 4.5 hours (with 3.2 mL of water collected). The temperature of the solution was then reduced to 155 degrees C. for about 6 hours (with 5.0 mL of water collected). The temperature of the solution was then reduced to 135 degrees C. for 16 hours. Nitrogen sparging was continued throughout the duration of the reaction. The molecular weight (Mn) of the product was 2110 with 8 meq/kg of unsaturated end groups and an APHA color of 86.

For Example 7, 1,3-propanediol (30 g) was added to a 100 mL round bottom flask. To this was added 1,1,2,2-tetrafluoroethanesulfonic acid (0.15 g). The contents of the flask were sparged with nitrogen gas at 200 cc/min for 12 hours. The nitrogen gas was bubbled through water with a fine porosity gas dispersion tube prior to being bubbled into the flask. The homogeneous solution was then heated with a heating mantle to 170 degrees C. for about 4 hours (with 9.50 mL of water collected). The temperature of the solution was then reduced to 155 degrees C. for about 7 hours (with 13.90 mL of water collected). The temperature of the solution was then reduced to 135 degrees C. for 16 hours. Wet nitrogen sparging was continued throughout the duration of the reaction. The molecular weight (Mn) of the product was 3141 with 9 meq/kg of unsaturated end groups and an APHA color of 27.

For Example 8, 1,3-propanediol (30 g) was added to a 100 mL round bottom flask. To this was added 1,1,2,2-tetrafluoroethanesulfonic acid (0.15 g). The contents of the flask were sparged with nitrogen gas at 200 cc/min for 12 hours. The nitrogen gas was bubbled through water with a fine porosity gas dispersion tube prior to being bubbled into the flask. The homogeneous solution was then heated with a heating mantle to 170 degrees C. for about 4 hours (with 6.65 mL of water collected). The temperature of the solution was then reduced to 155 degrees C. for about 7 hours (with 9.80 mL of water collected). The temperature of the solution was then reduced to 140 degrees C. for 6 hours. Wet nitrogen sparging was continued throughout the duration of the reaction. The molecular weight (Mn) of the product was 3479 with 12 meq/kg of unsaturated end groups and an APHA color of 28.

For Example 9, 1,3-propanediol (30 g) was added to a 100 mL round bottom flask. To this was added 1,1,2,2-tetrafluoroethanesulfonic acid (0.15 g). The contents of the flask were sparged with nitrogen gas at 200 cc/min for 12 hours. The nitrogen gas was bubbled through water with a fine porosity gas dispersion tube prior to being bubbled into the flask. The homogeneous solution was then heated with a heating mantle to 170 degrees C. for about 4 hours (with 7.05 mL of water collected). The temperature of the solution was then reduced to 158 degrees C. for about 3.75 hours (with 9.15 mL of water collected). The temperature of the solution was then reduced to 140 degrees C. for 6 hours. Wet nitrogen sparging was continued throughout the duration of the reaction. The molecular weight (Mn) of the product was 1170 with 8 meq/kg of unsaturated end groups and an APHA color of 14.

For Example 10, 1,3-propanediol (30 g) was added to a 100 mL round bottom flask. To this was added 1,1,2,2-tetrafluoroethanesulfonic acid (0.15 g). The contents of the flask were sparged with nitrogen gas at 200 cc/min for 12 hours. The nitrogen gas was bubbled through water with a fine porosity gas dispersion tube prior to being bubbled into the flask. The homogeneous solution was then heated with a heating mantle to 170 degrees C. for about 4 hours (with 6.30 mL of water collected). The temperature of the solution was then reduced to 155 degrees C. for about 7 hours (with 9.90 mL of water collected). The temperature of the solution was then reduced to 140 degrees C. for 4 hours. Wet nitrogen sparging was continued throughout the duration of the reaction. The molecular weight (Mn) of the product was 2139 with 12 meq/kg of unsaturated end groups and an APHA color of 20.

Table 1 provides a summary of product properties for Examples 5-10.

TABLE 1

| Example No. | Mn (g/mole) | Unsaturated End Groups (meq/kg) | APHA Color |
|---|---|---|---|
| 5 (Comparative) | 2967 | 9 | 128 |
| 6 (Comparative) | 2110 | 8 | 86 |
| 7 | 3141 | 9 | 27 |
| 8 | 3479 | 12 | 28 |
| 9 | 1120 | 8 | 14 |
| 10 | 2139 | 12 | 20 |

Examples 11-18

The reaction details for Examples 11-18 are provided in Table 2.

Examples 11 and 12 were carried out in 22 L reactors. Example 11 is a comparative example wherein sulfuric acid was used as the catalyst, and no water addition was performed to control the water concentration of the reaction mixture. The final water concentration was 200 ppm. The final APHA of the product was 116. Example 12 was carried out as described for Example 11, however water was added to the reaction at a rate of 3 mL/min. Water addition was started after the polyol Mn was about 434. The final APHA of the product was 8, which was significantly lower than that observed in Example 11. In Example 12, the water content was measured throughout the run. Just before the water addition was started, a sample was taken. This sample had an Mn=434 and a water content of 1412 ppm. After water addition was started, the water content increased and stayed steady between 2600 and 3000 ppm.

Examples 13 and 14 were carried out as described above in 1 L reactors. Example 13 is a comparative example wherein TFESA was used as the catalyst, and no water addition was performed to control the water concentration of the reaction mixture. The final APHA of the product was 3660. The reaction mixture started to discolor after only 4.5 hours. Example 14 was carried out as described for Example 13, however water was added to the reaction at a rate of 0.166 ml/min. Water addition was started right from the start of the run. The final APHA of the product was 108, which was significantly lower than that observed in Example 11.

Example 15 was performed as described for Example 14 except that the stirrer speed was increased from 120 to 200 rpm. The final APHA of the product was 66. The improved color relative to Example 14 is believed to be due to improved water distribution in the reaction mixture with increased stirring.

Example 16 was conducted in a 1 L reactor at 200° C. with a loading of 0.05 wt % TFESA. The water content of the reaction mixture was 2935 ppm just before water addition started. The addition of water resulted in a product having an APHA of 22. This color was observed even after the reaction was heated for more than 31 hours.

Example 17 was conducted in a 1 L reactor at 190° C. with a loading of 0.1 wt % TFESA. The addition of water resulted in a product having an APHA of 13.

Example 18 was conducted in a 1 L reactor at 210° C. with a loading of 0.02 wt % TFESA. The water content of the reaction mixture was 2872 ppm just before the addition of water was started. The addition of water resulted in a product having an APHA of 36.

Example 19

Example 19 was carried out in a 50 gallon baffled, glass-lined, oil jacketed reactor under nitrogen using 125 kg of 1,3-propanediol and 0.2 wt % trifluoromethanesulfonic acid. The reaction was heated to 170° C. while sparging with nitrogen (40-80 L/min) and mixing at 120 rpm. After 8 hours, water was added continuously to the reaction at a rate of 10 ml/min via the nitrogen sparge tube. Water addition ensured that the water concentration in the polymer reaction mixture stayed above 1500 ppm throughout the reaction. After 18 hours the Mn of the polymer reaction mixture was 300 and the water concentration 6100 ppm. At this time, the reaction temperature was decreased to 152° C. It took approximately 2 hours to decrease the temperature to the new temperature. The reaction was maintained at 152° C. until the end of the experiment. The reaction was shut down at 50 hours by decreasing the temperature of the heating jacket and adding several kilos of water to the reaction mixture. Prior to the shut down process, the Mn of the polymer reaction mixture was 2800 and the water concentration 1600 ppm. The final polymer had an Mn=2800, unsaturated end groups=13 meq/kg and an APHA=12. The total yield was about 75 kg.

Examples 20-21

Examples 20 and 21 exemplify the synthesis of a copolymer of polytrimethylene ether glycol, without and with the addition of water, respectively.

In Example 20 (comparative example), a mixture of 1,3-propanediol (75 mole %, 629 g) and 1,2-ethanediol (25 mole %, 171 g) was added to a 1000 mL cylindrical flask. To this was added 1,1,2,2-tetrafluoroethanesulfonic acid (4.0 g). The contents of the flask were sparged with nitrogen gas at 500 mL/min for 12 hours. The homogeneous solution was heated with a heating mantle to 170° C. for 10 hours. The temperature of the solution was then reduced to 155° C. for 12 hours. Agitation was accomplished with a stir shaft rotating at 300 rpm. Water evolved during the reaction was removed from the reaction vessel via a heated column leading to a condenser. Nitrogen sparging was continued throughout the duration of the reaction. The molecular weight (Mn) of the product was 1229 g/mole with 13 meq/kg of unsaturated end groups and an APHA color of 2953.

In Example 21, a mixture of 1,3-propanediol (75 mole %, 629 g) and 1,2-ethanediol (25 mole %, 171 g) was added to a 1000 mL cylindrical flask. To this was added 1,1,2,2-tetrafluoroethanesulfonic acid (4.0 g). The contents of the flask were sparged with nitrogen gas at 500 mL/min for 12 hours.

TABLE 2

| Ex. No. | Wt of PDO (g) | Wt % of Acid (2) | Acid Name | Stirrer Rate (rpm) | N2 sparge rate (L/min) | React. Temp. (° C.) | Water addition Rate (mL/min) | ~Mn when water addition started | Minimum Water Content (ppm) | Total Reaction time (hr) | Product Mn (g/mol) | Product Unsaturates (meq/kg) | Product APHA |
|---|---|---|---|---|---|---|---|---|---|---|---|---|---|
| 11 | 12000 | 0.9 | SA | 120 | 10 | 166 | 0 | NA | 200 | 25 | 1505 | 9.8 | 116 |
| 12 | 12000 | 0.9 | SA | 120 | 10 | 166 | 3 | 434 | 1412 | 24 | 1215 | 11.6 | 8 |
| 13 | 450 | 0.5 | TFESA | 120 | 0.4 | 170 | 0 | NA | — | 10.5 | 2865 | 40.0 | 3660(1) |
| 14 | 500 | 0.5 | TFESA | 120 | 0.4 | 170 | 0.166 | From start | — | 17.5 | 2168 | 26.6 | 108 |
| 15 | 500 | 0.5 | TFESA | 200 | 0.4 | 170 | 0.166 | From start | 5600 | 24 | 1810 | 22.5 | 66 |
| 16 | 500 | 0.05 | TFESA | 200 | 0.4 | 200 | 0.166 | 285 | 1800 | 31.25 | 2207 | 76.4 | 21 |
| 17 | 500 | 0.1 | TFESA | 120 | 0.4 | 190 | 0.166 | 344 | | 20.5 | 2019 | 38.0 | 13 |
| 18 | 500 | 0.02 | TFESA | 200 | 0.4 | 210 | 0.166 | 257 | 2000 | 23 | 2122 | 82.0 | 36 |

(1)The onset of color was observed after 4.5 hours
(2) based on weight of PDO

The homogeneous solution was heated with a heating mantle to 170° C. for 12 hours. The temperature of the solution was then reduced to 155° C. for 24 hours. Agitation was accomplished with a stir shaft rotating at 300 rpm. Water evolved during the reaction was removed from the reaction vessel via a heated column leading to a condenser. Nitrogen sparging was continued throughout the duration of the reaction. Liquid water was added to the reactor at a constant rate of 5 mL/hr using a syringe pump starting immediately after heating up the reactor contents and continued until the end of the reaction. The molecular weight (Mn) of the product was 1197 g/mole with 11 meq/kg of unsaturated end groups and an APHA color of 24.

The invention claimed is:

1. A process for producing a reaction product comprising at least one polytrimethylene ether glycol or copolymer thereof, comprising:
   (a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ -straight-chain diols, and $C_3$ through $C_{12}$ branched diols; and (3) at least one polycondensation catalyst whereby a reaction mixture comprising water is produced as said reacting proceeds; and
   (b) maintaining the water in the reaction mixture as the reacting proceeds at a concentration above at least about 0.08% by weight relative to the weight of the reaction mixture;
   whereby a reaction product is produced and wherein said reaction product has an $M_n$ of at least about 250 grams per mole.

2. The process of claim 1, wherein the water is maintained at about 0.08% to about 2.0% by weight relative to the weight of the reaction mixture.

3. The process of claim 1 or claim 2, wherein the reaction product of step (a) has an APHA color of about 100 or lower.

4. The process of claim 1, wherein the reaction product has a number-average molecular weight of at least about 1000 g/mole.

5. The process of claim 1, where the at least one alkanediol reactant is selected from the group consisting of 1,3-propanediol, a dimer of 1,3-propanediol and a trimer of 1,3-propanediol.

6. The process of claim 1 or claim 5, wherein the at least one comonomer diol is selected from the group consisting of 1,2-ethanediol, 2-methyl-1,3-propanediol, 2,2'-dimethyl-1,3-propanediol, 1-6-hexanediol, 1,7-heptanediol, 1,7-octanediol, 1,10-decanediol, and 1,12-dodecanediol.

7. The process of claim 1, wherein the at least one polycondensation catalyst is selected from the group consisting of inorganic acids, organic sulfonic acids including fluoroalkylsulfonic acids, metal salts, zeolites, fluorinated alumina, acid-treated alumina, heteropolyacids, heteropolyacids supported on zirconia, titania, alumina and/or silica, and ion exchange-based solid acid catalysts.

8. The process of claim 7, wherein the at least one polycondensation catalyst is selected from the group consisting of sulfuric acid, hydriodic acid, fluorosulfonic acid, phosphorous acid, p-toluenesulfonic acid, benzenesulfonic acid, methanesulfonic acid, phosphotungstic acid, nonafluorobutanesulfonic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, zirconium triflate, La($_{1,}$1,2,2,-tetrafluoroethane sulfonate)$_3$, La(1,1,2,3,3,3-hexafluoropropanesulfonates)$_3$, Sc($_{1,}$1,2,2,-tetrafluoroethane sulfonate)$_3$, Sc($_{1,}$1,2,3,3,3-hexafluoropropanesulfonates)$_3$, Ac($_{1,}$1,2,2,-tetrafluoroethane sulfonate)$_3$, Ac($_{1,}$1,2,3,3,3-hexafluoropropanesulfonates)$_3$, Yb($_{1,}$1,2,2,-tetrafluoroethane sulfonate)3, Yb($_{1,}$1,2,3,3,3-hexafluoropropanesulfonates)$_3$, SbF$_5$-HF, mixtures of fluorosulfuric acid and antimony pentachloride, perfluorinated ion-exchange polymers, and microcomposites comprising perfluorinated ion-exchange polymers.

9. The process of claim 1 or claim 8, wherein the at least one polycondensation catalyst is used at a concentration of about 0.01% to about 5.0% by weight relative to the weight of the initial reaction mixture.

10. The process of claim 1, wherein the process is carried out under an inert atmosphere.

11. The process of claim 1, wherein the temperature is from about 120° C. to about 250° C.

12. The process of claim 1, wherein said reacting is carried out at a temperature of about 120° C. to about 250° C. with at least one alkanediol reactant selected from the group consisting of 1,3-propanediol and oligomers of 1,3-propanediol having a degree of polymerization of 2-6, with at least one comonomer diol selected from the group consisting of ethanediol, $C_4$ through $C_{12}$ straight-chain diols, and $C_3$ through $C_{12}$ branched diols, and with at least one polycondensation catalyst selected from the group consisting of trifluoromethanesulfonic acid, nonafluorobutanesulfonic acid, 1,1,2,2-tetrafluoroethanesulfonic acid, 1,1,2,3,3,3-hexafluoropropanesulfonic acid, sulfuric acid and perfluorinated ion-exchange resins, wherein the at least one polycondensation catalyst is added at about 0.01 weight percent to about 5.0 weight percent relative to the weight of the reaction mixture, and wherein the reaction product has an APHA color value of about 100 or lower.

13. A process for producing a reaction product comprising at least one polytrimethylene ether glycol or copolymer thereof, comprising:
   (a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced over a reaction time as said reacting proceeds;
   (b) maintaining the water in the reaction mixture as the reacting proceeds at a concentration above at least about 0.08% by weight relative to the weight of the reaction mixture; and
   (c) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time;
   whereby a reaction product is produced and wherein said reaction product has an Mn of at least about 250 grams per mole.

14. The process of claim 13, where the at least one alkanediol reactant is selected from the group consisting of 1,3-propanediol, a dimer of 1,3-propanediol and a trimer of 1,3-propanediol, and where the at least one comonomer diol is selected from the group consisting of 1,2-ethanediol, 2-methyl-1,3-propanediol, 2,2'-dimethyl-1,3-propanediol, 1-6- hexanediol, 1,7-heptanediol, 1,7-octanediol, 1,10-decanediol, and 1,12-dodecanediol.

15. The process of claim 13, wherein said controlling is carried out at a temperature of about 120° C. to about 210° C. with the average temperature in the first half of the reaction time being between 2° C. and about 50° C. higher than in the second half of the reaction time.

16. The process of claim 13, wherein the at least one polycondensation catalyst is selected from the group consisting of inorganic acids, organic sulfonic acids including fluoroalkylsulfonic acids, metal salts, zeolites, fluorinated alumina, acid-treated alumina, heteropolyacids, heteropolyacids supported on zirconia, titania, alumina and/or silica, and ion exchange-based solid acid catalysts.

17. The process of claim 16, wherein the at least one polycondensation catalyst is selected from the group consisting of sulfuric acid, hydriodic acid, fluorosulfonic acid, phosphorous acid, p-toluenesulfonic acid, benzenesulfonic acid, methanesulfonic acid, phosphotungstic acid, nonafluorobutanesulfonic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, zirconium triflate, La(1,1,2,2,-tetrafluoroethane sulfonate)3, La(1,1,2,3,3,3-hexafluoropropanesulfonates)3, Sc(1,1,2,2,-tetrafluoroethane sulfonate)3, Sc(1,1,2,3,3,3-hexafluoropropanesulfonates)3, Ac(1,1,2,2,-tetrafluoroethane sulfonate)3, Ac(1,1,2,3,3,3-hexafluoropropanesulfonates)3, Yb(1,1,2,2,-tetrafluoroethane sulfonate)3, Yb(1,1,2,3,3,3-hexafluoropropanesulfonates)3, SbF5-HF, mixtures of fluorosulfuric acid and antimony pentachloride, perfluorinated ion-exchange polymers, and microcomposites comprising perfluorinated ion-exchange polymers.

18. The process of claim 13, wherein the at least one polycondensation catalyst is used at a concentration of about 0.01% to about 5.0% by weight relative to the weight of the initial reaction mixture.

19. The process of claim 13, wherein the unsaturation of the reaction product is less than or equal to about 25 meq/kg.

20. The process of claim 13, wherein the number-average molecular weight of the reaction product is at least about 1000 g/mole.

21. The process of claim 13, wherein the reaction product has a color of less than or equal to about 100 APHA units.

22. A process for producing at least one polytrimethylene ether glycol or copolymer thereof, comprising:
(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, $C_4$ through $C_{12}$ straight-chain diols, and $C_3$ through $C_{12}$ branched diols; and (3) at least one polycondensation catalyst whereby a reaction mixture comprising water is produced as said reacting proceeds;
(b) maintaining the water in the reaction mixture as the reacting proceeds at a concentration above at least about 0.08% by weight relative to the weight of the reaction mixture whereby a reaction product is produced and wherein said reaction product has an Mn of at least about 250 grams per mole; and
(c) recovering at least one polytrimethylene glycol or copolymer thereof from the reaction product of (b).

23. A process for producing a reaction product comprising at least one polytrimethylene ether glycol or copolymer thereof, comprising:
(a) reacting (1) at least one alkanediol reactant selected from the group consisting of 1,3-propanediol and oligomers of 1,3-propanediol having a degree of polymerization of 2-6, (2) optionally, at least one comonomer diol selected from the group consisting of ethanediol, C4 through C12 straight-chain diols, and C3 through C12 branched diols; and (3) at least one polycondensation catalyst whereby a reaction mixture comprising water is produced over a reaction time as said reacting proceeds;
(b) maintaining the water in the reaction mixture as the reacting proceeds at a concentration above at least about 0.08% by weight relative to the weight of the reaction mixture;
(c) controlling the temperature of the reaction mixture over said reaction time wherein said controlling is carried out at a temperature of about 120° C. to about 250° C. with the average temperature in the first half of the reaction time being about 2° C. to about 70° C. higher than the average temperature during the second half of the reaction time; whereby a reaction product is produced and wherein said reaction product has an Mn of at least about 250 grams per mole; and
(d) recovering at least one polytrimethylene glycol or copolymer thereof from the reaction product of (c).

* * * * *